![United States Patent Office] 2,865,483
Patented Dec. 23, 1958

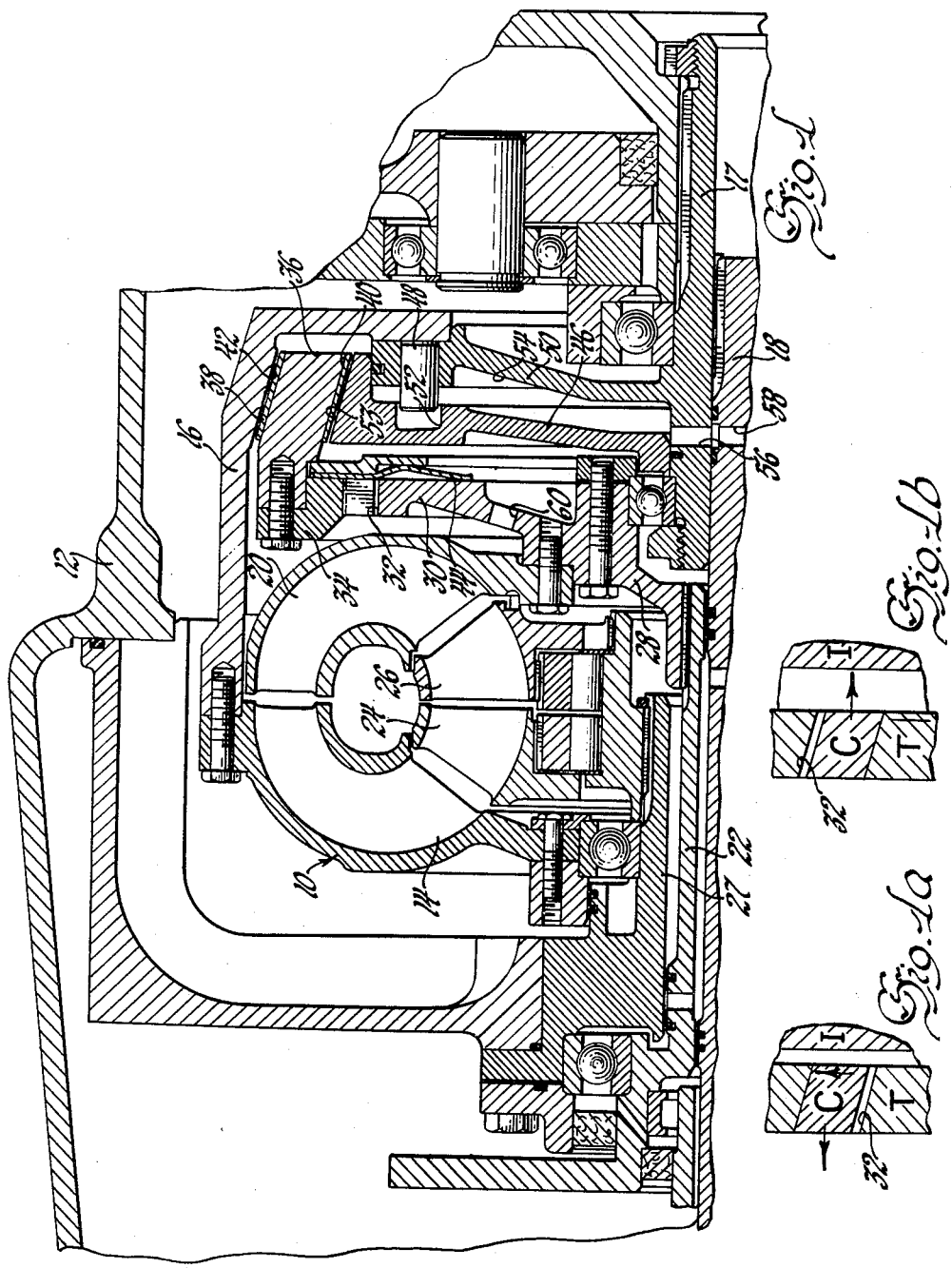

2,865,483

LOCKUP CLUTCH MEANS FOR FLUID TORQUE CONVERTERS AND THE LIKE

William G. Livezey, Indianapolis, Ind., assignor to General Motors Corporation, Detroit, Mich., a corporation of Delaware Application November 25, 1955, Serial No. 549,056

6 Claims. (Cl. 192—3.2)

This invention relates to lockup clutches generally and more particularly to such clutches as used with fluid torque converters.

Fluid torque converters, as used with vehicle drive means, besides providing infinitely variable torque multiplication between drive members thereof should also include direct drive lockup means for use during certain situations: as for example, when torque multiplication approaches unity, to prevent drive losses; when the driven means tend to overrun the driving means, to provide engine braking; and to enable a reverse drive condition, as for push starting a vehicle using a torque converter.

It is here proposed to provide improved direct drive lockup clutch means for use with fluid torque converters to engage together the impeller and turbine members thereof in each of the situations mentioned. A clutch member is provided which is axially movable in response to drive conditions within the torque converter to connect the drive means thereof, and an annular piston, concentrically disposed with respect to the clutch means, is controlled to engage and lockup or release the clutch member as the situation calls for.

In the drawing:

Figure 1 is a cross-sectional view of a fluid torque converter including the present invention.

Figures 1a and 1b are diagrammatic representations of part of the clutch means of the present invention.

A fluid torque converter unit 10 is disposed within the transmission housing 12 and includes an impeller member 14, connected through the impeller housing 16 to drive shaft members 17 and 18, a rotor or turbine member 20, connected to an output sleeve shaft 22, and stator or reactor members 24 and 26, connected to the ground sleeve 27 which is in turn connected to the transmission housing.

The member 28 connecting the turbine 20 to the output sleeve shaft 22 includes an annular flange 30 having helix splineways 32 formed on the peripheral edge thereof. A ring member 34 having complementary helix splineways is received on member 28 and has an annular clutch member 36 secured thereto. The clutch member has friction facings 38 and 40 on external and internal engaging surfaces thereof. The external facing 38 of the clutch member is disposed for engagement with a complementary surface 42 formed from the pump housing 16 (which housing is part of the impeller drive means).

Spring fingers 44 secured to the ring member 34 of the clutch means and engaging the axially fixed member 28 bias the clutch member 36 into tickling engagement with impeller housing surface 42. Also, the spring fingers with member 30 as a stop prevent clutch member 36 from engaging clutch facings 40 and 53 when piston 46 is in disengaged position.

Concentrically disposed in the plane of the clutch member 36 is an axially movable annular piston 46. Guide pins 48 secured within the end wall 50 of the impeller housing 16 are received within guide recesses 52 formed within the face of the annular piston. The peripheral surface 53 of the annular piston is disposed to engage the internal face of the clutch member 36. A fluid chamber 54 is formed between the annular piston 46 and the impeller housing end wall 50 and is in communication with a fluid pressure supply source through passages 56 and 58 formed through the drive shaft members 17 and 18. Fluid pressure within chamber 54 backs off the annular piston 46 from engagement with the clutch member 36 while the absence of a positive pressure within chamber 54 causes fluid pressure within the fluid torque converter 10, and available through accesses 60 provided through member 28, to move the annular piston 46 to engage the clutch member 36 and lockup the clutch to the impeller housing 16 for providing a direct drive connection between drive members of the fluid torque converter unit.

Figures 1a and 1b show diagrammatically the helix spline means 32 connecting the clutch member 36 to the turbine 20 and the movement of the clutch member relative to the impeller drive means during torque multiplication and turbine overrun, respectively. For simplification the clutch, turbine, and impeller means are designated C, T, and I in these figures.

During torque multiplication in the converter 10, with the impeller driving the turbine, the engagement of the clutch means C with the turbine T (through member 28), and the overrun of the impeller I, causes clutch means C to engage the forward or lead side of the splineway, as shown in Figure 1a. Such engagement causes the clutch means C to move up the inclined or helix surface and back off from engagement with the impeller I. It should be kept in mind that spring fingers 44 bias the clutch means C into a light tickling engagement with the impeller I, as before mentioned, and it is this engagement which is interrupted by the action of the helix surfaces during overrun of the impeller I.

When the rotor or turbine means T tends to overrun the impeller means I, as when torque multiplication approaches zero or the drive is through the turbine for push starting, the leading side of the spline of the turbine means T engages the trailing side of the spline of the clutch means C to urge the clutch means into engagement with the impeller means I. This tendency to shift the clutch means C axially into engagement with the impeller means I (actually the pump housing surface 42) is assisted by the biasing effect of the spring fingers 44.

The helix spline connecting means between the turbine and clutch means thus affords an automatically responsive direct drive engagement between the impeller and turbine members when required and means which may be locked up by actuation of the annular piston 46 by merely relieving the pressure within the fluid chamber 54 which normally holds the lockup means inoperative.

I claim:

1. Fluid drive clutch means for use within a fluid torque converter for directly connecting impeller and rotor members thereof, said clutch means including an annular clutch member, helix splineways securing said clutch member to the rotor member of said torque converter and permitting axial travel of said clutch member relative to the impeller member of said torque converter for engaging said impeller member to said rotor member, and means biasing said clutch member in light engagement with said impeller member, said splineways engaging said clutch member to said impeller member during the overrun of said rotor member and disengaging said clutch member therefrom during the overrun of said impeller member, with and in opposition to said biasing means, respectively.

2. Lockup clutch means comprising an annular clutch member disposed between a drive member and a driven member, means biasing said clutch member into light engagement with said drive member, helix spline means engaging said clutch member to said driven member, said spline means axially moving said clutch member into engagement with said drive member during the overrun of said driven member and axially moving said clutch member out of engagement with the drive member in opposition to said biasing means during overrun of the drive member, and an annular piston concentrically disposed with respect to said clutch member and axially movable for engaging said clutch member to said drive member and locking said drive and driven members together.

3. In a fluid torque converter including an impeller member, an impeller housing drivingly connected to said impeller and a turbine member fluid connected to the impeller member, lockup clutch means including an annular clutch member having a conical surface thereof disposed for engagement with said pump housing, helix splineways engaging said clutch member to said turbine member and moving said clutch member axially into and out of engagement with said housing during the overrun of said turbine and impeller members respectively, means biasing said clutch member into light engagement with said housing, and pressure responsive piston means concentrically disposed within said clutch means and axially movable for engaging and locking said clutch member to said housing to provide a direct drive connection between said impeller and turbine members.

4. Clutch means for connecting drive and driven members comprising a clutch member having a conical clutch surface thereon disposed adjacent a complementary clutch surface on the drive member, biasing means constantly urging said clutch surfaces into light engagement, helix splineways engaging said clutch member with said driven member and moving said clutch member axially to engage said clutch surfaces during overrun of the driven member relative to the drive member and to disengage in opposition to the biasing means said clutch surfaces during overrun of the drive member relative to the driven member and means selectively operable for connecting said clutch member and said driven member during overrun between the driving and driven members in either direction.

5. In hydrodynamic drive device including fluid connected impeller and turbine members, lock-up clutch means for providing a direct drive connection between said impeller and turbine members, the lock-up clutch means comprising an annular clutch member having a conical surface thereof disposed for engagement with said impeller member, helix splineways engaging said clutch member to said turbine member and moving said clutch member conical surface axially into and out of engagement with said impeller member during overrun of said turbine and impeller members respectively, means biasing said clutch member conical surface into light engagement with the impeller member, pressure responsive piston means axially movable from a disengaged position to an engaged position in which engaged position said clutch member conical surface engages the impeller and locks together said impeller and turbine members, and a source of pressure fluid for supplying a working pressure to said hydrodynamic drive device, the working pressure in said hydrodynamic drive device being maintained at a pressure less than the pressure from the source, said source of pressure being selectively available to maintain said piston means in the disengaged position and relievable to allow pressure in said hydrodynamic drive device to move said piston means to the engaged position locking together said impeller and turbine members.

6. Clutch means for connecting a drive member and a driven member and which includes a clutch member, helix spline means connecting said clutch member to said driven member, means biasing said clutch member into light engagement with said drive member while engaged with said driven member, said spline means causing disengagement in opposition to said biasing means of said clutch member from said drive member during the overrun of said drive member relative to said driven member, said spline means causing engagement of said clutch member during the overrun of said driven member relative to said driving member, and means selectively operable for connecting said clutch member and said driven member during overrun between the driving and driven members in either direction.

References Cited in the file of this patent

UNITED STATES PATENTS

| | | |
|---|---|---|
| 936,190 | Tuckfield | Oct. 5, 1909 |
| 1,530,961 | Toutee | Mar. 24, 1925 |
| 1,557,432 | Defordt | Oct. 13, 1925 |
| 2,708,993 | Munschaner | May 24, 1955 |
| 2,745,295 | Burnett | May 15, 1956 |

FOREIGN PATENTS

| | | |
|---|---|---|
| 407,337 | Great Britain | Mar. 12, 1934 |
| 181,783 | Australia | Apr. 25, 1955 |